United States Patent
Udy et al.

(10) Patent No.: US 12,520,975 B2
(45) Date of Patent: Jan. 13, 2026

(54) CASTER LOCKING ARRANGEMENT AND SURFACE CLEANING DEVICE IMPLEMENTING SAME

(71) Applicant: SHARKNINJA OPERATING LLC, Needham, MA (US)

(72) Inventors: Adam Udy, Sutton (GB); Nikola Petrov, Needham, MA (US); Daniel J. Innes, West Roxbury, MA (US)

(73) Assignee: SharkNinja Operating LLC, Needham, MA (US)

( * ) Notice: Subject to any disclaimer, the term of this patent is extended or adjusted under 35 U.S.C. 154(b) by 386 days.

(21) Appl. No.: 18/111,368

(22) Filed: Feb. 17, 2023

(65) Prior Publication Data

US 2023/0200601 A1    Jun. 29, 2023

Related U.S. Application Data

(63) Continuation of application No. 17/229,174, filed on Apr. 13, 2021, now Pat. No. 11,583,150.
(Continued)

(51) Int. Cl.
*A47L 5/28* (2006.01)
*A47L 5/22* (2006.01)

(52) U.S. Cl.
CPC ............ *A47L 5/28* (2013.01); *A47L 5/225* (2013.01)

(58) Field of Classification Search
CPC . A47L 5/28; A47L 5/225; A47L 9/009; A47L 9/02; A47L 5/36; A47L 9/00;
(Continued)

(56) References Cited

U.S. PATENT DOCUMENTS 2,687,546 A * 8/1954 Oppenheimer ......... B60B 33/08
188/74
3,336,623 A    8/1967 Coates et al.
(Continued)

FOREIGN PATENT DOCUMENTS

CN    201745510    2/2011
CN    209305233    8/2019
(Continued)

OTHER PUBLICATIONS

PCT Search Report and Written Opinion mailed Jul. 19, 2021, received in corresponding PCT Application No. PCTUS21/27044, 8 pages.
(Continued)

*Primary Examiner* — Monica S Carter
*Assistant Examiner* — Christopher Soto
(74) *Attorney, Agent, or Firm* — Grossman Tucker Perreault & Pfleger, PLLC

(57) ABSTRACT

A nozzle for use with a surface cleaning device is disclosed that includes a nozzle housing defining a dirty air inlet, at least a first caster coupled to the nozzle housing to allow for movement of the nozzle housing over a surface to be cleaned, and a caster locking arrangement coupled to the nozzle housing. The caster locking arrangement preferably includes at least a first locking member to transition the first caster between a locked configuration and an unlocked configuration, with the locked configuration limiting movement of the nozzle housing along a single axis during cleaning operations, and the unlocked configuration allowing for movement of the nozzle housing along a plurality of axes/directions during cleaning operations.

14 Claims, 14 Drawing Sheets

Related U.S. Application Data

(60) Provisional application No. 63/009,201, filed on Apr. 13, 2020.

(58) Field of Classification Search
CPC ... A47L 5/00; B60B 33/0002; B60B 33/0036; B60B 33/0039; B60B 33/0042; B60B 33/006; B60B 33/0065; B60B 33/0078; B60B 33/0094; B60B 33/0097; B60B 33/02; B60B 33/021; B60B 33/023; B60B 33/025; B60B 33/026; B60B 33/028
See application file for complete search history.

(56) References Cited

U.S. PATENT DOCUMENTS

| | | | |
|---|---|---|---|
| 6,345,408 B1 * | 2/2002 | Nagai | A47L 9/327 15/361 |
| 7,926,145 B2 | 4/2011 | Liao | |
| 9,907,446 B2 * | 3/2018 | Toole | A47L 9/242 |
| 2005/0015917 A1 | 1/2005 | Mattingly et al. | |
| 2006/0275146 A1 | 12/2006 | Williams | |
| 2009/0056065 A1 | 3/2009 | Finke | |
| 2013/0058635 A1 | 3/2013 | Vrdoljak | |
| 2013/0152337 A1 | 6/2013 | Thorne | |
| 2013/0269147 A1 | 10/2013 | Conrad | |
| 2014/0150201 A1 | 6/2014 | McGee et al. | |
| 2015/0013102 A1 | 1/2015 | Bilger | |
| 2015/0040340 A1 | 2/2015 | Bilger et al. | |
| 2015/0135474 A1 | 5/2015 | Gidwell | |
| 2015/0297054 A1 | 10/2015 | Weeks et al. | |
| 2015/0351596 A1 | 12/2015 | Thorne | |
| 2016/0128530 A1 | 5/2016 | Thorne et al. | |
| 2016/0174793 A1 | 6/2016 | Burke et al. | |
| 2016/0220080 A1 | 8/2016 | Thorne | |
| 2016/0220081 A1 | 8/2016 | Xu et al. | |
| 2016/0220082 A1 | 8/2016 | Thorne et al. | |
| 2016/0324388 A1 | 11/2016 | Vrdoljak et al. | |
| 2016/0374533 A1 | 12/2016 | Innes et al. | |
| 2017/0042319 A1 | 2/2017 | Conrad et al. | |
| 2017/0112343 A1 | 4/2017 | Innes et al. | |
| 2017/0127896 A1 | 5/2017 | Carter et al. | |
| 2017/0144810 A1 | 5/2017 | Birdsell | |
| 2017/0215667 A1 | 8/2017 | Thorne et al. | |
| 2017/0347848 A1 | 12/2017 | Carter et al. | |
| 2018/0035854 A1 | 2/2018 | Thorne | |
| 2018/0064301 A1 | 3/2018 | Cottrell et al. | |
| 2018/0068815 A1 | 3/2018 | Cottrell | |
| 2018/0070785 A1 | 3/2018 | Udy et al. | |
| 2018/0070788 A1 | 3/2018 | Senoo et al. | |
| 2018/0255991 A1 | 9/2018 | Der Marderosian et al. | |
| 2018/0296046 A1 | 10/2018 | Thorne et al. | |
| 2018/0306432 A1 | 10/2018 | Ognjen et al. | |
| 2018/0325252 A1 | 11/2018 | Hopke et al. | |
| 2018/0338654 A1 | 11/2018 | Kelsey | |
| 2018/0338656 A1 | 11/2018 | Carter et al. | |
| 2019/0038098 A1 | 2/2019 | Thorne et al. | |
| 2019/0059668 A1 | 2/2019 | Thorne et al. | |
| 2019/0069740 A1 | 3/2019 | Thorne et al. | |
| 2019/0069744 A1 | 3/2019 | Liggett et al. | |
| 2019/0090701 A1 | 3/2019 | Tonderys et al. | |
| 2019/0090705 A1 | 3/2019 | Thorne et al. | |
| 2019/0191947 A1 | 6/2019 | Freese et al. | |
| 2019/0193120 A1 | 6/2019 | Brown et al. | |
| 2019/0246853 A1 | 8/2019 | Sardar et al. | |
| 2019/0274500 A1 | 9/2019 | Thorne et al. | |
| 2019/0274501 A1 | 9/2019 | Antonisami et al. | |
| 2019/0302793 A1 | 10/2019 | Leech et al. | |
| 2019/0320865 A1 | 10/2019 | Brown et al. | |
| 2019/0320866 A1 | 10/2019 | Thorne et al. | |
| 2019/0335968 A1 | 11/2019 | Harting et al. | |
| 2019/0343349 A1 | 11/2019 | Clare et al. | |
| 2019/0357740 A1 | 11/2019 | Thorne et al. | |
| 2020/0000298 A1 | 1/2020 | Brown et al. | |
| 2020/0022543 A1 | 1/2020 | Gill et al. | |
| 2020/0022544 A1 | 1/2020 | Gill et al. | |
| 2020/0022553 A1 | 1/2020 | Gill et al. | |
| 2020/0037833 A1 | 2/2020 | Niedzwecki et al. | |
| 2020/0037843 A1 | 2/2020 | Fiebig et al. | |
| 2020/0046184 A1 | 2/2020 | Freese et al. | |
| 2020/0077855 A1 | 3/2020 | Brown et al. | |
| 2020/0085267 A1 | 3/2020 | Thorne et al. | |
| 2020/0085269 A1 | 3/2020 | Thorne | |
| 2020/0121144 A1 | 4/2020 | Gacin et al. | |
| 2020/0121148 A1 | 4/2020 | Hoffman et al. | |
| 2020/0138260 A1 | 5/2020 | Sutter et al. | |
| 2020/0166949 A1 | 5/2020 | Leech et al. | |
| 2020/0170470 A1 | 6/2020 | Liggett et al. | |
| 2020/0201348 A1 | 6/2020 | Leech | |
| 2020/0205631 A1 | 7/2020 | Brown et al. | |
| 2020/0205634 A1 | 7/2020 | Sutter et al. | |
| 2020/0237171 A1 | 7/2020 | Xu et al. | |
| 2020/0288929 A1 | 9/2020 | Brunner | |
| 2020/0288930 A1 | 9/2020 | Wells | |
| 2020/0297172 A1 | 9/2020 | Tonderys et al. | |
| 2020/0301430 A1 | 9/2020 | Irkliy et al. | |
| 2020/0315418 A1 | 10/2020 | Howard et al. | |
| 2020/0345196 A1 | 11/2020 | Innes et al. | |
| 2020/0367711 A1 | 11/2020 | Thorne et al. | |
| 2020/0371526 A1 | 11/2020 | Kamada | |
| 2020/0383547 A1 | 12/2020 | Sutter et al. | |
| 2021/0007569 A1 | 1/2021 | Howard et al. | |
| 2021/0022574 A1 | 1/2021 | Harting | |
| 2021/0030227 A1 | 2/2021 | Mathieu et al. | |
| 2021/0038032 A1 | 2/2021 | Brown | |
| 2021/0059495 A1 | 3/2021 | Gill et al. | |
| 2021/0085144 A1 | 3/2021 | Woodrow et al. | |
| 2021/0169289 A1 | 6/2021 | Thorne et al. | |
| 2021/0175772 A1 | 6/2021 | Aini | |
| 2021/0177223 A1 | 6/2021 | Der Marderosian et al. | |
| 2021/0186282 A1 | 6/2021 | Mathieu et al. | |
| 2021/0204684 A1 | 7/2021 | Heman-Ackah et al. | |
| 2021/0254615 A1 | 8/2021 | Burbank | |
| 2021/0307581 A1 | 10/2021 | Thorne et al. | |
| 2021/0315428 A1 | 10/2021 | Udy et al. | |
| 2021/0386261 A1 | 12/2021 | Woodrow et al. | |
| 2021/0386262 A1 | 12/2021 | Uchendu et al. | |
| 2022/0031131 A1 | 2/2022 | McClay et al. | |
| 2022/0031133 A1 | 2/2022 | Der Marderosian et al. | |
| 2022/0031134 A1 | 2/2022 | Yang et al. | |
| 2022/0061614 A1 | 3/2022 | Yu et al. | |
| 2022/0071459 A1 | 3/2022 | Gacin et al. | |
| 2022/0095864 A1 | 3/2022 | Der Marderosian et al. | |
| 2022/0125256 A1 | 4/2022 | Lessard et al. | |
| 2022/0287521 A1 | 9/2022 | Cottrell et al. | |
| 2022/0322903 A1 | 10/2022 | Lessard | |
| 2022/0400922 A1 | 12/2022 | Mcclay et al. | |
| 2022/0408994 A1 | 12/2022 | Hill | |
| 2023/0043567 A1 | 2/2023 | Copeland et al. | |
| 2023/0070147 A1 | 3/2023 | Harting et al. | |
| 2023/0157495 A1 | 5/2023 | Copeland et al. | |
| 2023/0248192 A1 | 8/2023 | Brown et al. | |
| 2023/0329502 A1 | 10/2023 | Chirikjian | |
| 2024/0415352 A1 | 12/2024 | McClay et al. | |

FOREIGN PATENT DOCUMENTS

| | | |
|---|---|---|
| CN | 216393939 | 4/2022 |
| EP | 0688528 | 12/1995 |

OTHER PUBLICATIONS

Chinese Office Action with English language translation issued Sep. 20, 2024, received in Chinese Patent Application No. 2021800282701, 13 pages.

* cited by examiner

CASTER LOCKING ARRANGEMENT AND SURFACE CLEANING DEVICE IMPLEMENTING SAME

CROSS-REFERENCE TO RELATED APPLICATIONS

This application claims the benefit of U.S. Provisional Application No. 63/009,201 filed on Apr. 13, 2020, which is incorporated herein by reference in its entirety.

TECHNICAL FIELD

This specification relates to surface cleaning apparatuses, and more particularly, to a caster locking arrangement that allows for selectively locking and unlocking associated caster wheels for purposes of transitioning between a normal mode and a side-ways (or multi-direction) mode.

BACKGROUND INFORMATION

The following is not an admission that anything discussed below is part of the prior art or part of the common general knowledge of a person skilled in the art.

Powered surface cleaning devices, such as vacuum cleaners, have multiple components that each receive electrical power from one or more power sources (e.g., one or more batteries or electrical mains). For example, a vacuum cleaner may include a suction motor to generate a vacuum within a cleaning head. The generated vacuum collects debris from a surface to be cleaned and deposits the debris, for example, in a debris collector. The vacuum may also include a motor to rotate a brushroll within the cleaning head. The rotation of the brushroll agitates debris that has adhered to the surface to be cleaned such that the generated vacuum is capable of removing the debris from the surface. In addition to electrical components for cleaning, the vacuum cleaner may include one or more light sources to illuminate an area to be cleaned.

BRIEF DESCRIPTION OF THE DRAWINGS

These and other features advantages will be better understood by reading the following detailed description, taken together with the drawings wherein.

The drawings included herewith are for illustrating various examples of articles, methods, and apparatuses of the teaching of the present specification and are not intended to limit the scope of what is taught in any way.

Figure 4A:
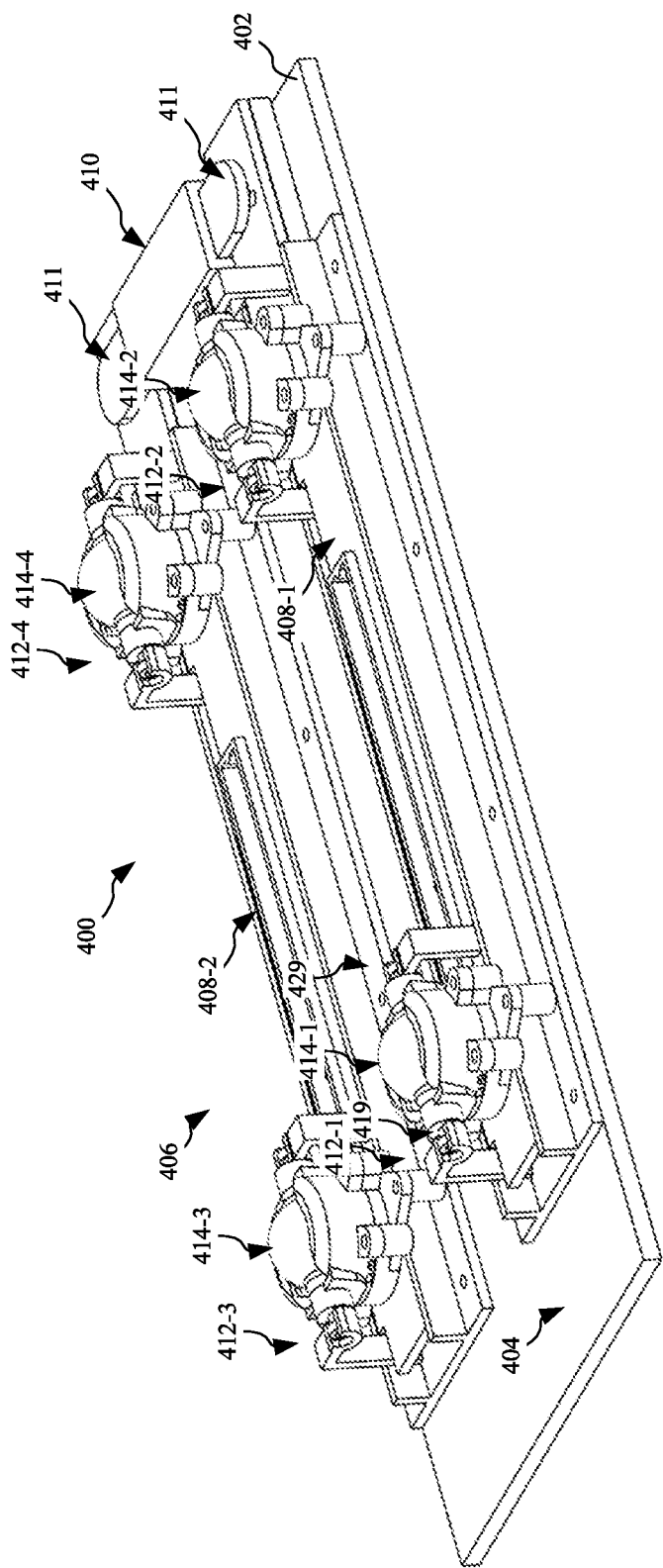
FIG. 4A shows a bottom perspective view another example caster locking arrangement in accordance with aspects of the present disclosure.

FIB. 4B shows a top perspective view of the caster locking arrangement of FIG. 4A in accordance with aspects of the present disclosure.

Figure 4B:
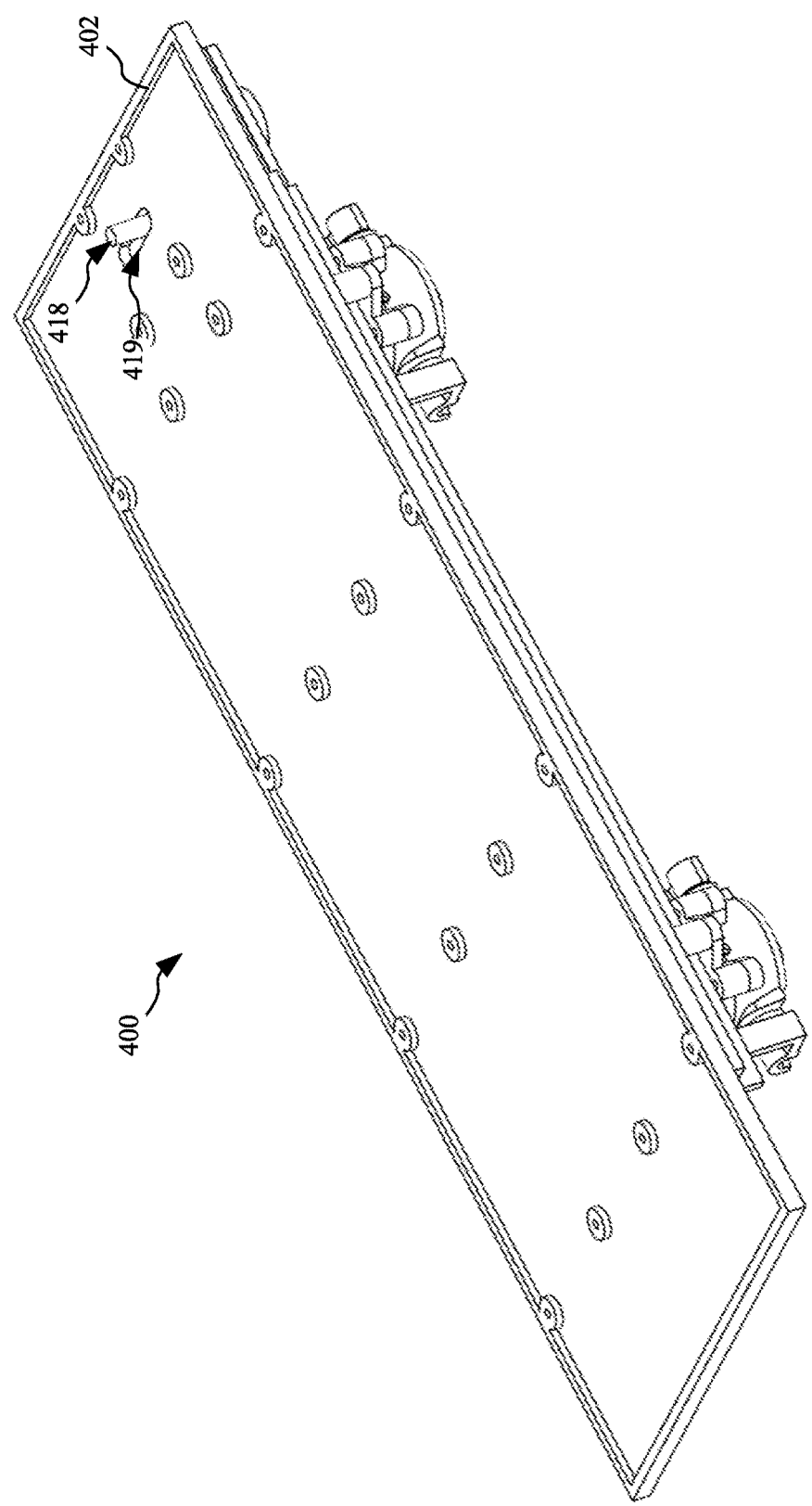
Figure 4C:
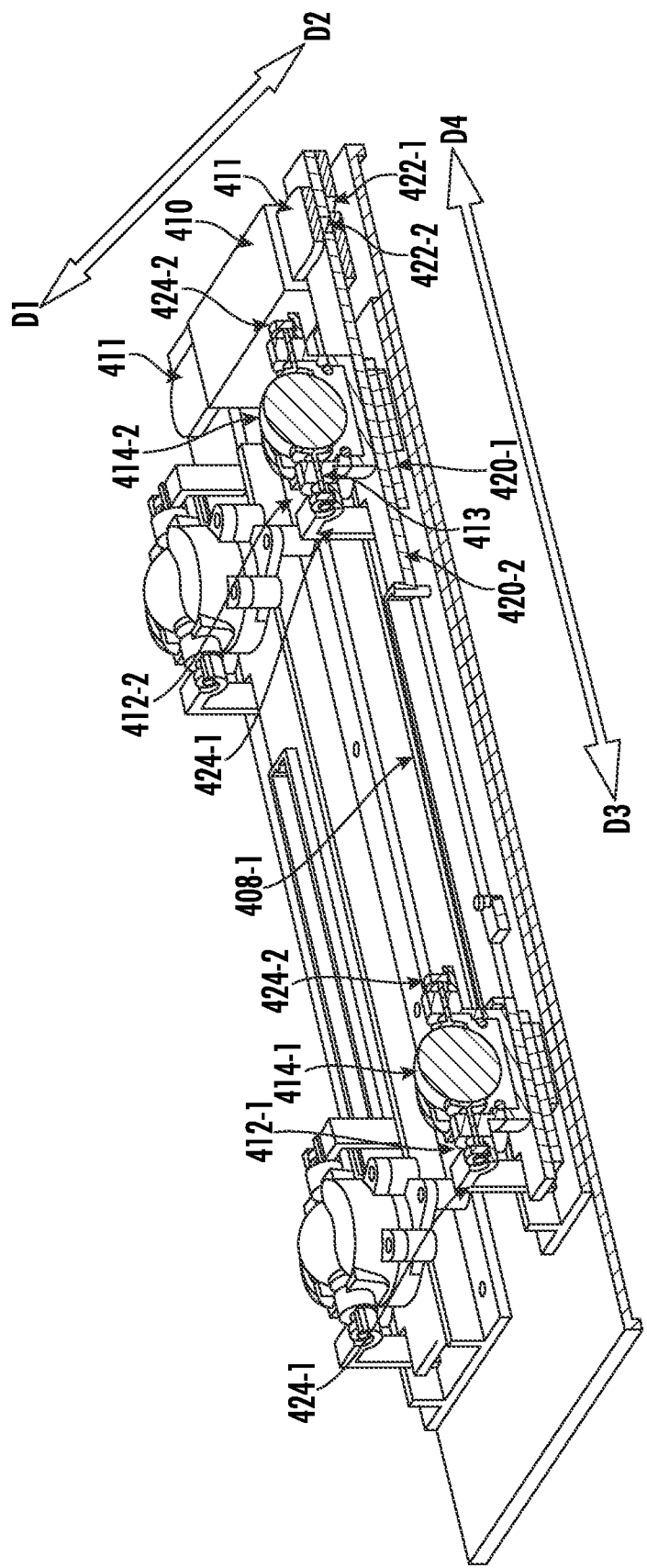

FIG. 4C shows a cross-sectional view of the caster locking arrangement of FIG. 4A in accordance with aspects of the present disclosure.

Figure 4D:
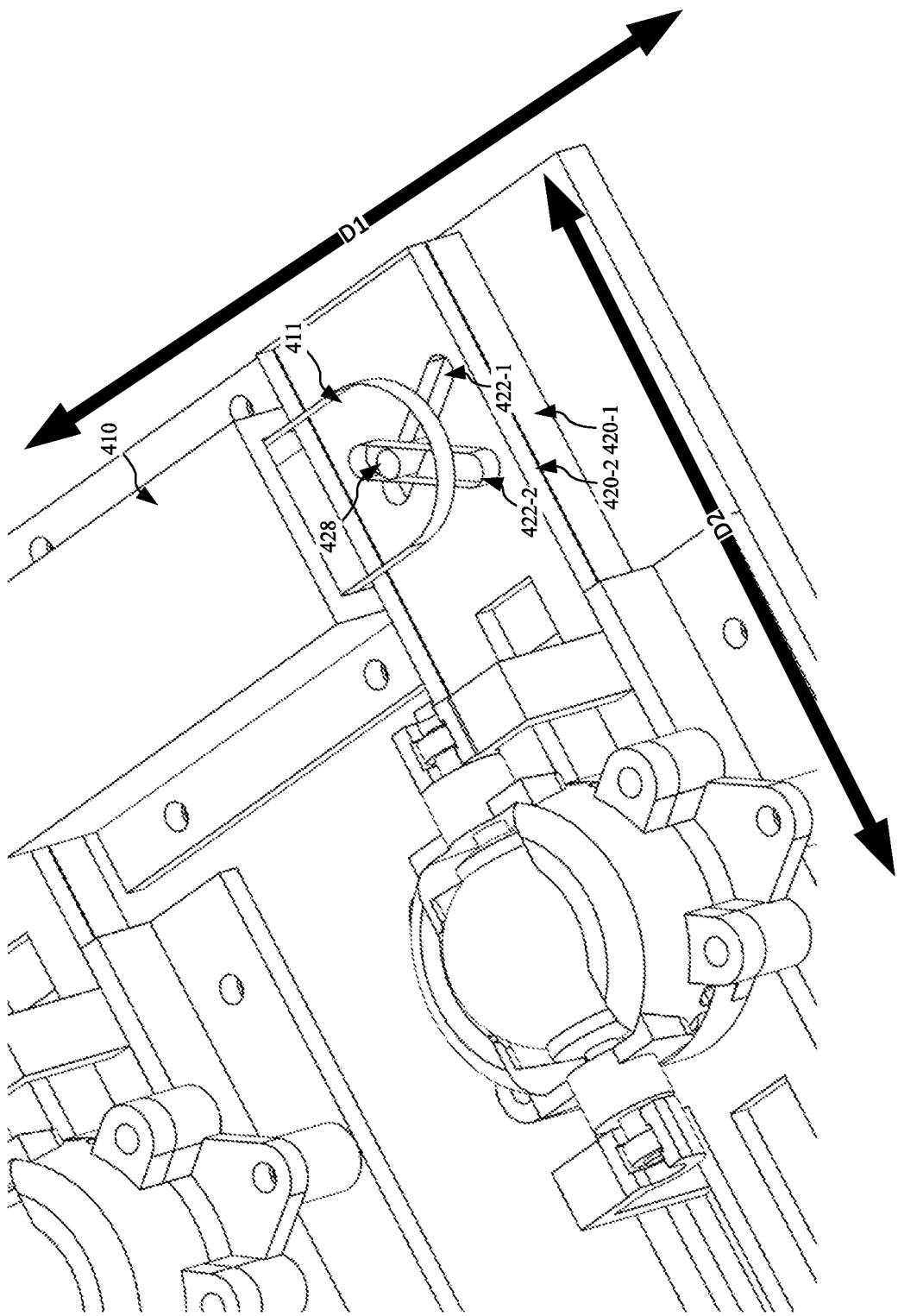

FIG. 4D shows an enlarged view of the caster locking arrangement of FIG. 4A in accordance with aspects of the present disclosure.

Figure 5:
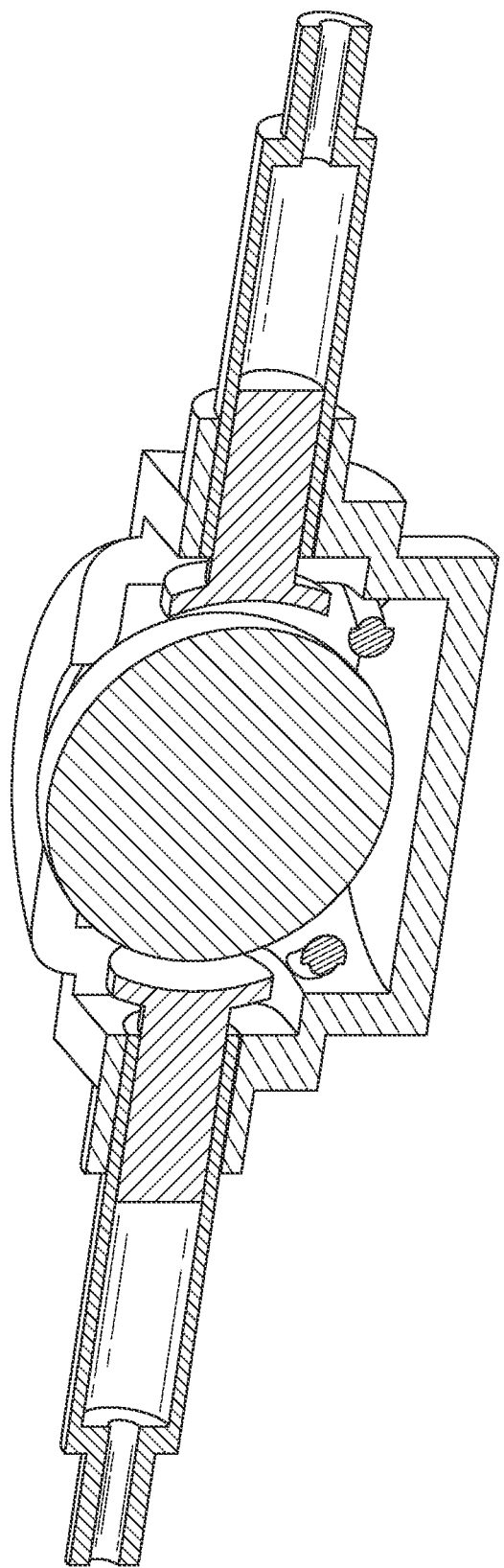

FIG. 5 shows another example of locking caster receptacle in accordance with aspects of the present disclosure.

Figure 6:
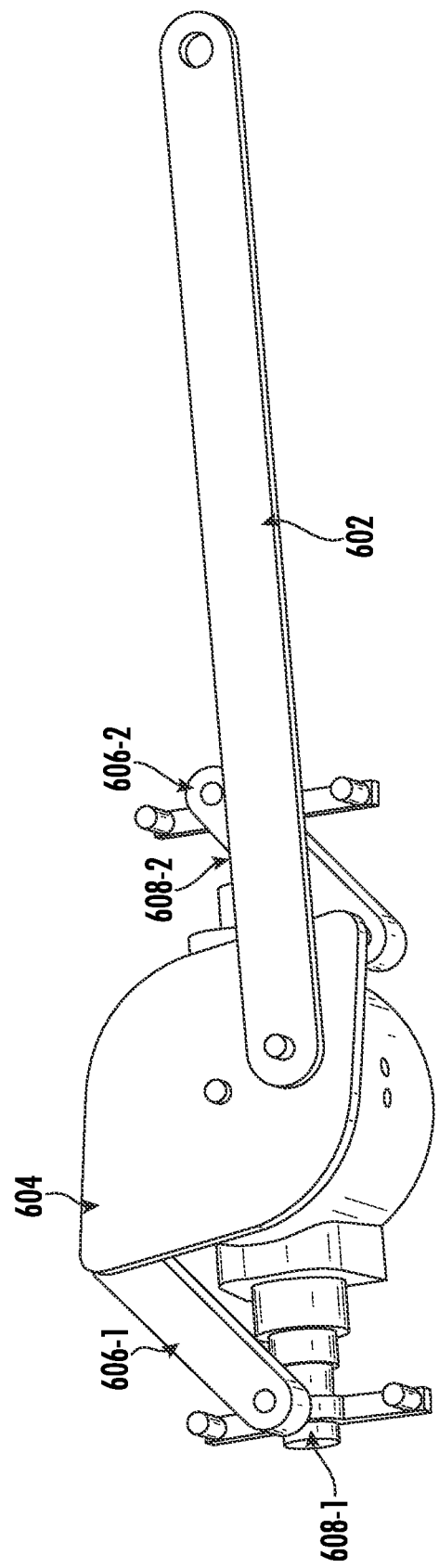

FIG. 6 shows an actuator suitable for use by the locking caster receptacle of FIG. 5, in accordance with aspects of the present disclosure.

Figure 7A:
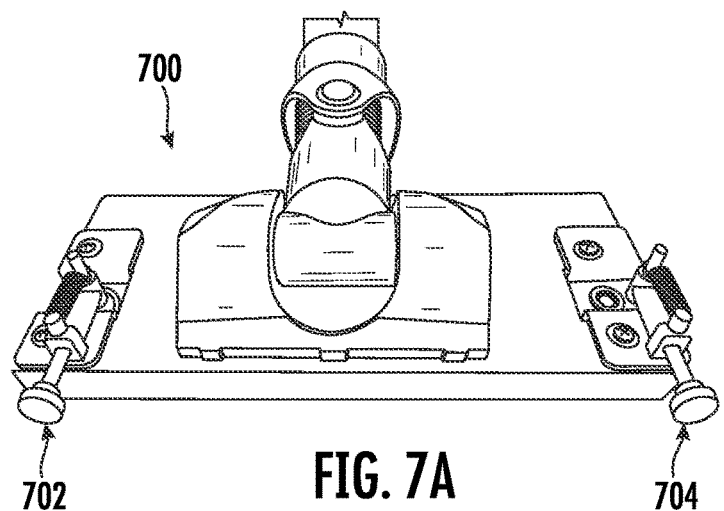

FIG. 7A shows a perspective view of another caster locking arrangement consistent with aspects of the present disclosure.

Figure 7B:
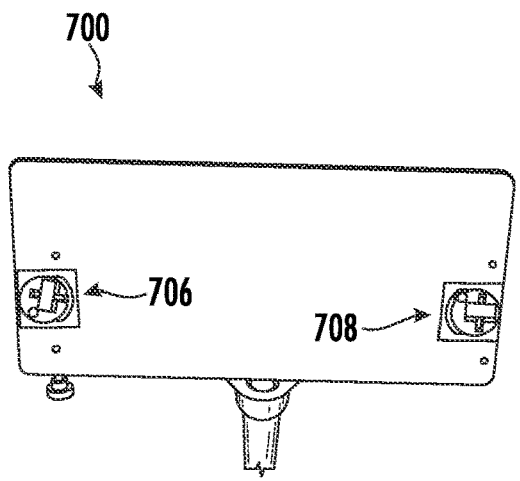

FIG. 7B shows a bottom view of the caster locking arrangement of FIG. 7A in accordance with aspects of the present disclosure.

Figure 7C:
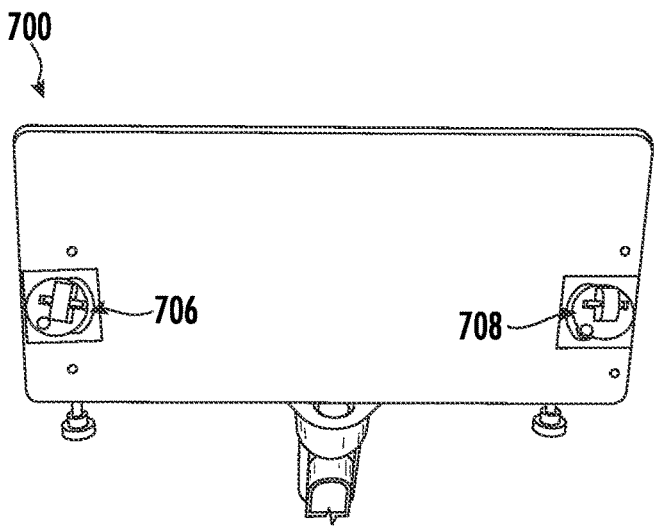

FIG. 7C shows another bottom view of the caster locking arrangement of FIG. 7A in accordance with aspects of the present disclosure.

Figure 8:
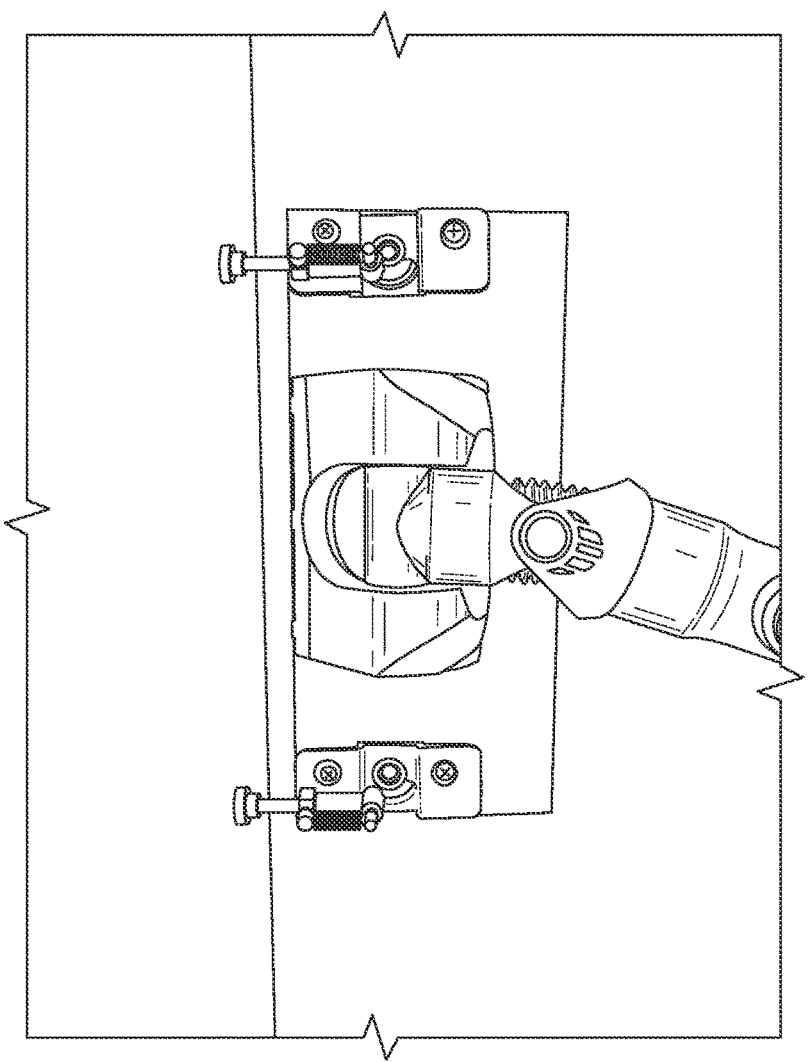

FIG. 8 shows another perspective view of the caster locking arrangement of FIG. 7A in accordance with aspects of the present disclosure.

Figure 9:
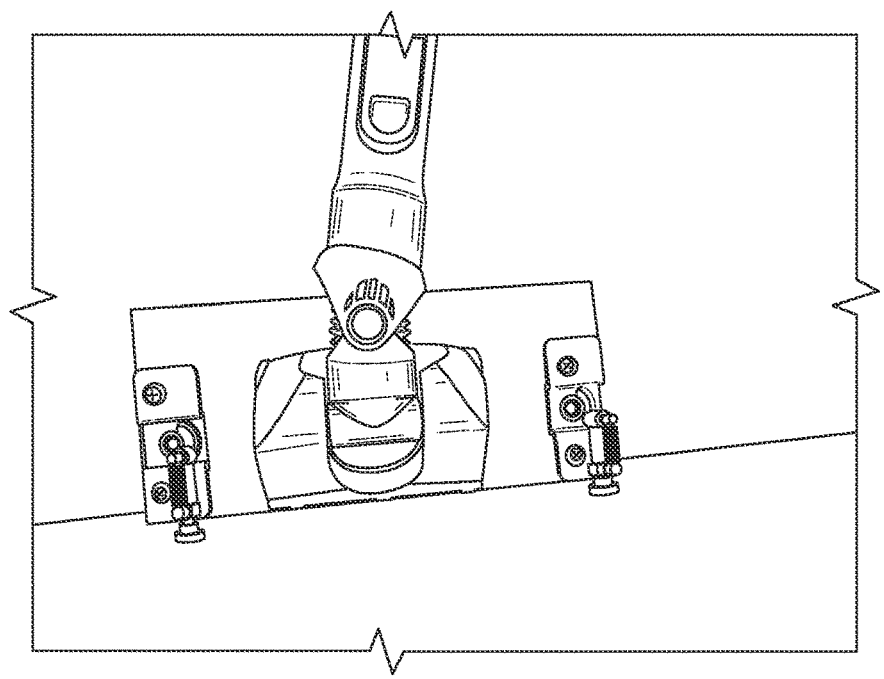

FIG. 9 shows another perspective view of the caster locking arrangement of FIG. 7A in accordance with aspects of the present disclosure.

DETAILED DESCRIPTION

In general, the present disclosure is directed to a caster locking arrangement for use with a surface cleaning device, and preferably, for use within a nozzle housing of surface cleaning device. In more detail, the nozzle housing preferably defines a dirty air inlet and is coupled to the caster locking arrangement. The locking caster arrangement preferably includes a locked configuration to restrict movement direction of the nozzle housing during cleaning operations, and an unlocked configuration for unrestricted movement directions of the nozzle housing during cleaning operations. The nozzle housing further preferably comprises a neck that defines a suction passageway extending therethrough and a nozzle coupling section rotatably coupled to the nozzle housing to provide a lock position and an unlock position. In response to the neck rotating to the unlocked position, the caster locking arrangement preferably transitions to the unlocked configuration to allow for multi-directional movements, such as lateral movements to allow the nozzle to travel in directions that extend substantially parallel with a longitudinal axis of the nozzle housing, herein referred to as "side-ways" cleaning.

Although the following figures and description illustrate and refer to so-called "upright" vacuums, this disclosure is not necessarily limited in this regard. For example, caster locking arrangements consistent with the present disclosure are equally suitable for use in other types of surface cleaning devices such as stick-vacs and in vacuum attachments such as wands.

Figure 1:
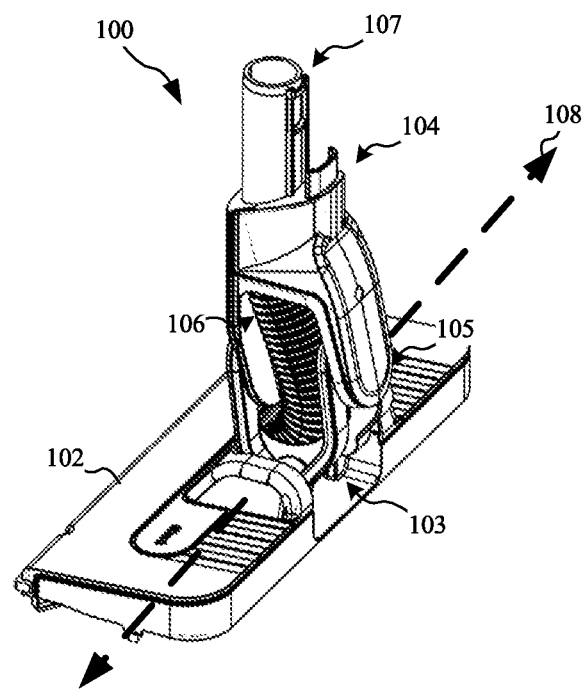
FIG. 1 shows a perspective view of a nozzle implementing a caster locking arrangement in accordance with aspects of the present disclosure.
Figure 2:
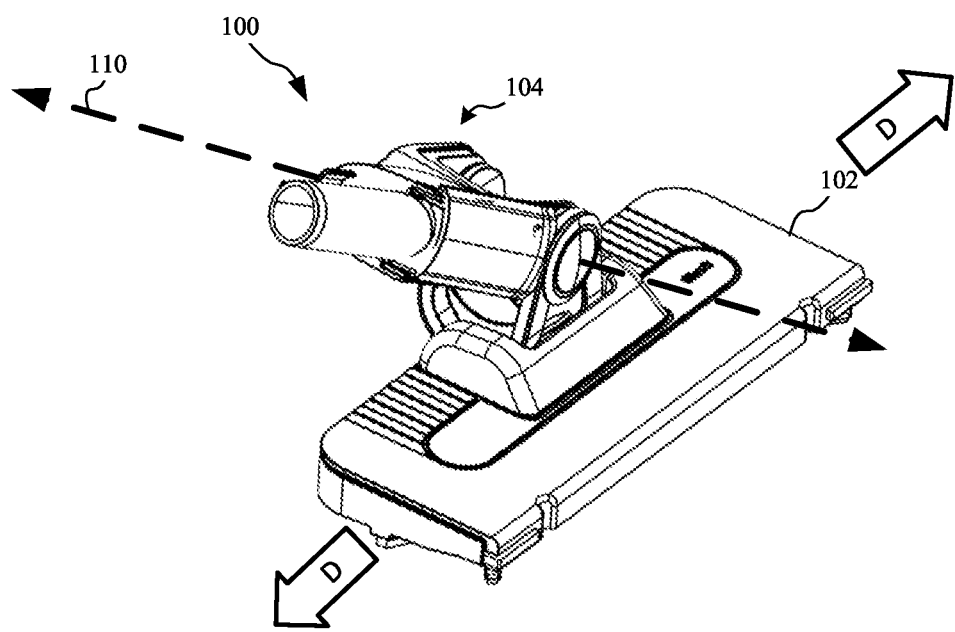
FIG. 2 shows another perspective view of the nozzle of FIG. 1 in accordance with aspects of the present disclosure.

Turning to the Figures, FIGS. 1-2 show an example nozzle 100 for use with a surface cleaning device, such as an upright or stick vac-type vacuum. As shown, the nozzle 100 preferably includes a nozzle housing 102, and pivot neck 104 (which may also be referred to herein simply as a neck).

The pivot neck 104 preferably includes a nozzle coupling section 103 at a first end for pivotally coupling with the nozzle housing 102, and a second end 107 for fluidly coupling with, for example, a suction motor by way of a wand or other structure. The first end may be referred to as a nozzle coupling end herein and the second end may be referred to as a mounting section.

The pivot neck 104 preferably pivotally couples to the nozzle housing 102 and rotates about first rotational axis 108, with the first axis of rotation extending substantially parallel with the longitudinal axis of the nozzle housing 102. Stated differently, the pivot neck 104 allows for a user to adjust the angle of the pivot neck relative to a surface supporting the nozzle 100 (and/or the nozzle housing 102) using, for example, a handle (not shown) or other grip-able portion coupled to the mounting section 107.

The pivot neck 104 can include integrated pivot connectors, referred to herein as pivot necks or simply pivots, adjacent the nozzle coupling section 103 that allow for rotational movement of the pivot neck 104 about the first rotational axis 108 to selectively lock and unlock an associated caster arrangement, as will be discussed in greater detail below.

The pivot neck 104 preferably defines a cavity that extends from the nozzle coupling section 103 to the mounting section 107. As shown in FIG. 1, a hose 106 preferably extends at least partially through the cavity of the pivot neck 104 and fluidly couples a dirty air inlet of the nozzle, such as the dirty air opening/inlet 121-1 of FIG. 3A, to a suction motor and dust cup (not shown).

Figure 3A:
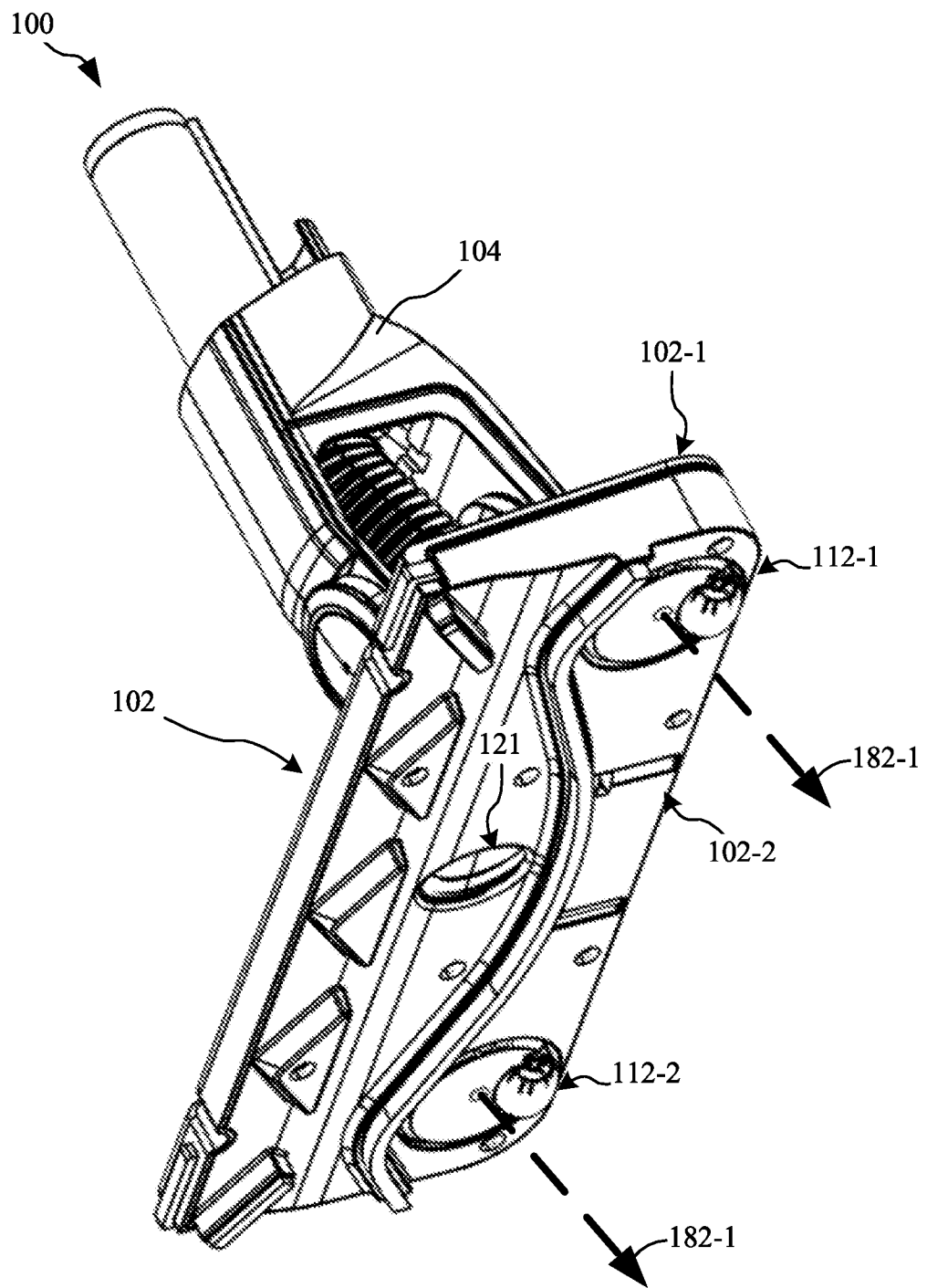
FIG. 3A shows a perspective bottom view of the nozzle of FIG. 1 in accordance with aspects of the present disclosure.
Figure 3B:
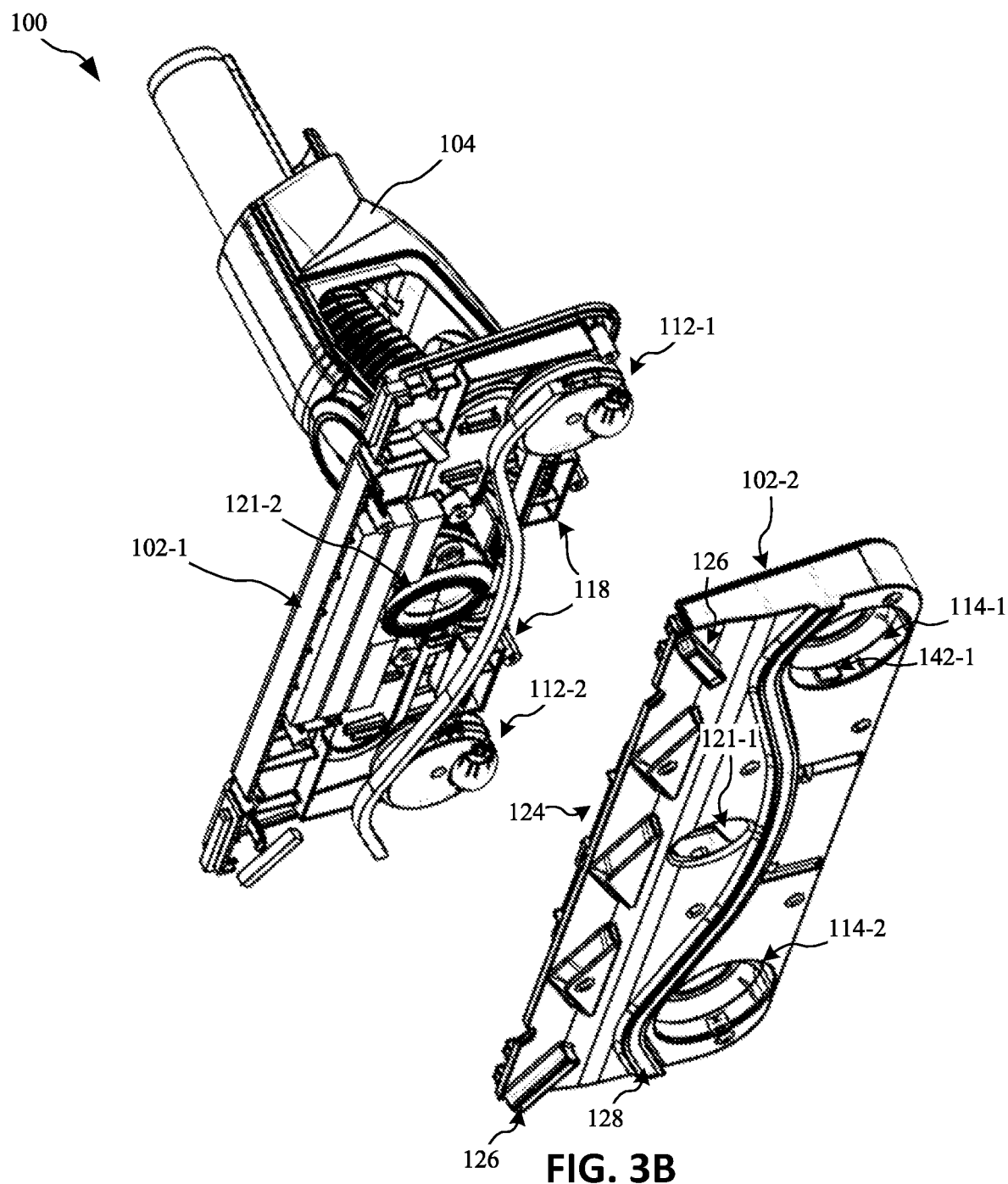
FIG. 3B shows a partially-exploded view of the nozzle of FIG. 3A in accordance with aspects of the present disclosure.

FIGS. 3A-3E show additional aspects of the nozzle 100 in accordance with the present disclosure. As shown in FIG. 3A, the nozzle housing 102 preferably comprises a first housing portion 102-1 coupled to a second housing portion 102-2. The first and second housing portions 102-1, 102-2 may comprise for example, plastic or any other suitably rigid material.

The second housing portion 102-2 preferably defines first and second caster openings (or receptacles) 114-1, 114-2, respectively, and a dirty air inlet opening 121-1. The first and second caster openings 114-1, 114-2 align with a caster locking arrangement 118 and inlet port 121-2. Thus, the caster locking arrangement 118, and more particularly, casters 112-1 and 112-2 preferably extend through the first and second caster opening 114-1 and 114-2 when the first and second housing portions are coupled together. Likewise, the dirty air inlet opening 121-1 transitions to the inlet port 121-2. For simplicity, the dirty air inlet opening 121-1 and inlet port 121-2 are referred to herein collectively as a dirty air inlet 121.

The second housing portion 102-2 further preferably defines a plurality of guides 124 in the form of triangular protrusions that are angled to direct dirt/debris towards the dirty air inlet 121 during cleaning operations. A curved guide 128 preferably extends along the length of the second housing portion 102-2 and is configured to direct dirt and debris generally towards the dirty air inlet 121. Edge guides 126 are preferably disposed at opposite ends of the second housing portion 102-2. The edge guides 126 and curved guide 128 collectively form side openings/channels that allow for dirt and debris to pass therein and be generally directed towards the dirty air inlet 121 during multi-directional/side-ways cleaning operations.

The pivot neck 104 further includes a pivot joint 105 (See FIG. 1), with the pivot joint 105 allowing the mounting section to rotate about a second rotational axis 110 (See FIG. 2), with the second rotational axis 110 extending substantially transverse relative to the longitudinal axis of the nozzle housing 102 and/or the first rotational axis 108. The pivot neck 104 may therefore be accurately referred to as a multi-segment neck, whereby the upper segment/section defining the mounting section 107 rotates relative to a fixed lower section of the pivot neck 104 that couples into the nozzle housing 102. The pivot joint 105 provides additional degrees of freedom during cleaning operations. As discussed in further detail below, the pivot joint 105 also further allows for a user to angle an associated handle in a manner that allows for convenient so-called "side-ways" cleaning that, when the nozzle 100 is transitioned to the unlock/multi-directional configuration, allows the nozzle to be driven in a direction D that is substantially parallel with the longitudinal axis of the nozzle housing 102, such as shown in FIG. 2.

Continuing on, the first and second housing portions 102-1, 102-2 further preferably include the caster locking arrangement 118 disposed therebetween. As is more clearly shown in the partially-exploded view of the nozzle 100 shown in FIG. 3C, the caster locking arrangement 118 includes first and second casters 112-1, 112-2 and first and second locking members 130-1, 130-2.

Figure 3C:
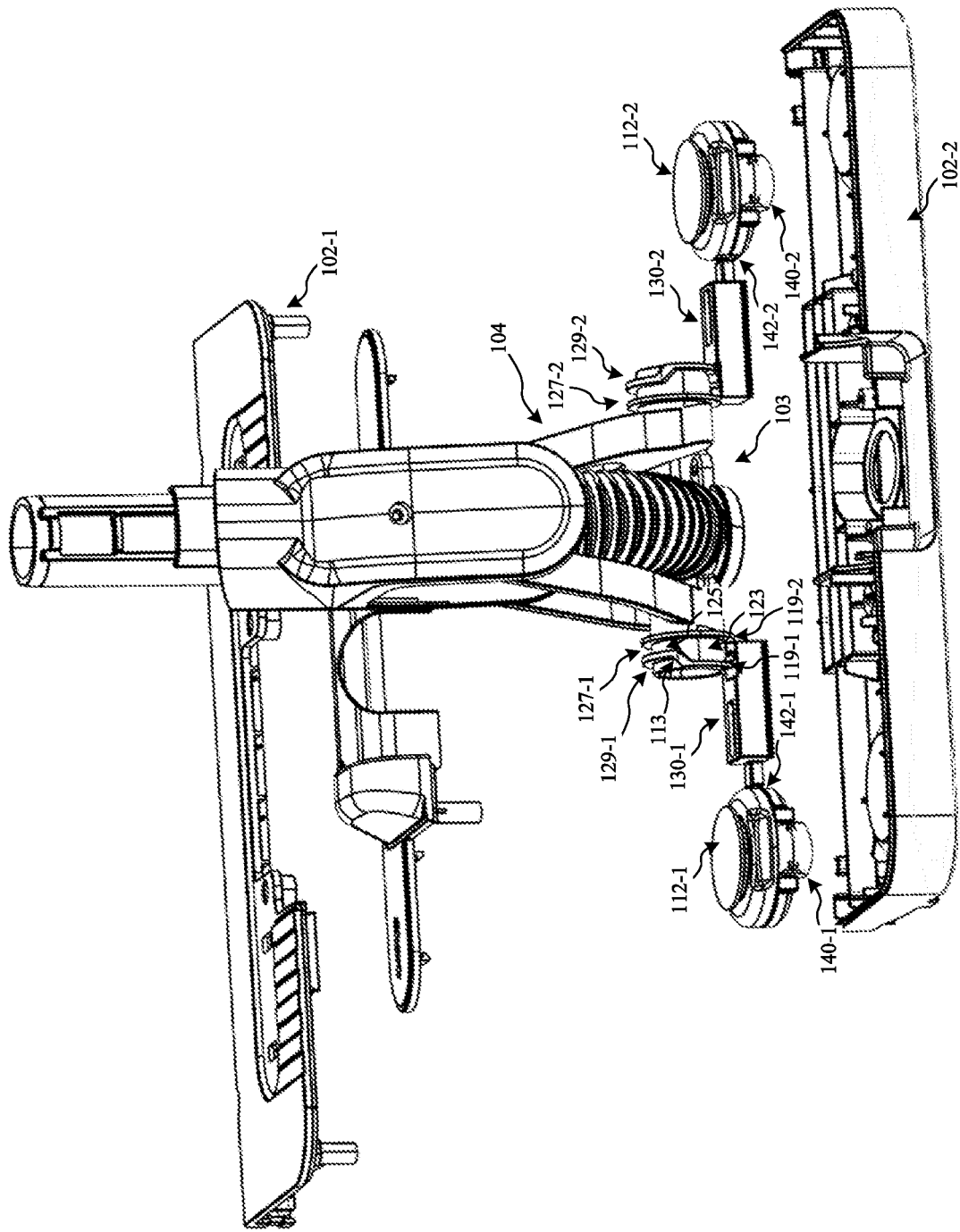
FIG. 3C shows another partially-exploded view of the nozzle of FIG. 3A in accordance with aspects of the present disclosure.

As further shown in FIG. 3C, the first and second locking members 130-1, 130-2 preferably extend coaxially with each other and in parallel with the longitudinal axis of the nozzle housing 102. Each of the first and second locking members 130-1, 130-2 preferably include a body having a first end adjacent the nozzle coupling section 103 of the pivot neck 104, and a second end that is aligned with locking slots of the first and second casters 112-1, 112-2, as discussed further below.

The first and second pivot necks 129-1, 129-2 preferably extend from the pivot neck 104 coaxially with each other, and define first and second grooves/tracks 127-1, 127-2, respectively. The first and second pivot necks 129-1, 129-2 are preferably integrally formed with the pivot neck 104 as a single, monolithic piece. More preferably, the first and second pivot necks 129-1, 129-2 are fixedly attached/coupled to the pivot neck 104 such that rotation of the pivot neck 104 causes proportional rotation of the first and second pivot necks 129-1, 129-2.

The first end of each of the first and second locking members 130-1, 130-2, is preferably aligned with first and second pivot necks 129-1, 129-2. For example, and as shown in FIG. 3C, this preferably includes the first locking member 130-1 having a tooth/projection at the first end that extends into the first groove 127-1 provided by the first neck pivot 129-1, and the second locking member 130-2 having a tooth/projection at the first end that extends into the second groove 127-2 provided by the second neck pivot 129-2, as discussed in greater detail below.

Each of the first and second grooves 127-1, 127-2 preferably extend around at least a portion of the outer surfaces defining the first and second pivot necks 129-1, 129-2. The first and second grooves 127-1, 127-2 are preferably defined by annular rings which extend radially from the first and second pivot necks 129-1, 129-2, respectively. For instance, the first groove 127-1 is preferably defined at least in part by a first annular ring/rim 119-1 disposed adjacent a distal end of the first pivot neck 129-1, and a second annular ring/rim 119-2 disposed between the distal end and the pivot neck 104.

The first annular ring 119-1 further preferably includes an angled section 113 that extends towards the second annular ring 119-1 such that the distance between the first and second annular rings 119-1, 119-2 transitions from a first offset distance OD1 to a second offset distance OD2, with the first offset distance OD1 being greater than the second offset distance OD2. Accordingly, the first and second grooves 127-1, 127-2 preferably define a first region 123 that extends/transitions to a second region 125, with the first region 123 having an overall width equal to OD1 that tapers/transitions to the second region 125 having an overall width equal to OD2. The relative widths of the first and second regions 123, 125, preferably allow for the tooth/projection of the first locking member 130-1 to be slidably displaced towards to engage, and away to disengage, from the first caster 112-1 based on rotational movement of the pivot neck 104. The second pivot neck 129-2 is preferably a mirror image of the first pivot neck 129-1, the description of which is equally applicable to the second pivot neck 129-2 and will not be repeated for brevity.

Figure 3D:
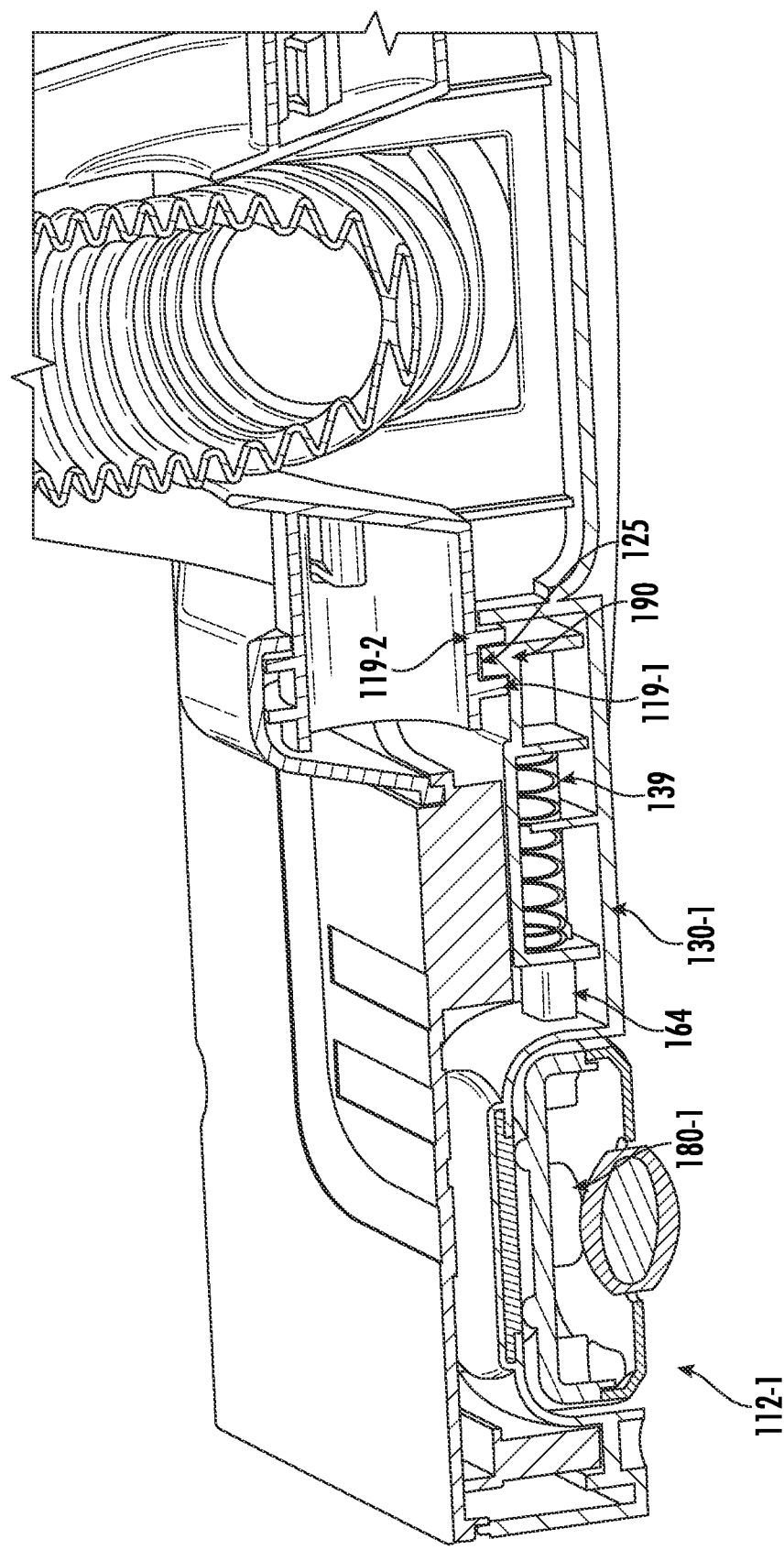
FIG. 3D shows a cross-sectional view of the nozzle of FIG. 3A in accordance with aspects of the present disclosure.
Figure 3E:
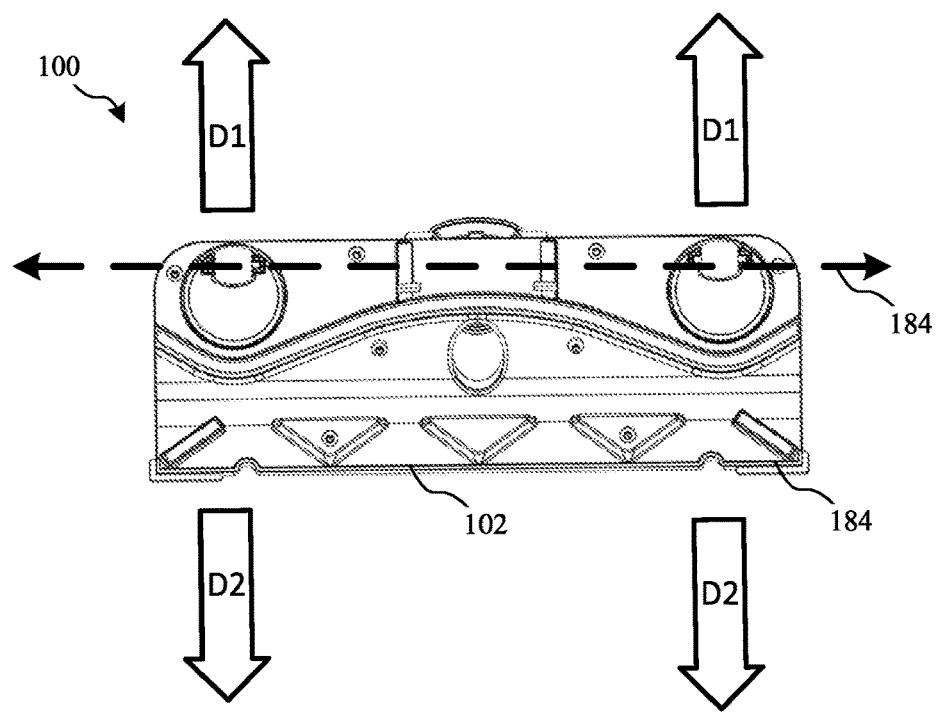
FIG. 3E shows a nozzle implementing a caster locking arrangement consistent with the present disclosure in a locked configuration.

Turning to the cross-sectional view of FIG. 3D, with additional reference to FIG. 3C, the first end of each of the first and second locking members 130-1, 130-2 include a protrusion/tooth, e.g., protrusion 190, that at least partially extends into the first and second grooves 127-1, 127-2 of the first and second pivot necks 129-1, 129-2, respectively. As shown, the first locking member 130-1 defines a cavity that includes a spring 139 (or spring member) disposed therein. The spring 139 is preferably configured to provide a spring bias force that generally extends towards the first caster 112-1 (and away from the pivot neck 104), and more preferably along a direction that extends substantially parallel with the longitudinal axis of the nozzle housing 102. The spring 139 preferably provides the bias force against the second end of the first locking member 130-1, and importantly, to bias the locking tab/projection 164 towards the first caster 112-1.

Thus, when the pivot neck 104 is rotated such that the tooth 190 is within the confines of the second region 125, the first locking member 130-1 is displaced away from the first caster 112-1 (e.g., based on the first annular ring 119-1 engaging the tooth 190) and towards the pivot neck 104. The second locking member 130-2 preferably includes a substantially similar configuration and allows for the second locking member 130-1 to be displaced away from the second caster 112-2 in a synchronized manner with the first locking member 130-1 based on the second pivot neck 129-2. In this example, rotation of the pivot neck 104 can include the user rotating a handle member to cause the pivot neck 104 to extend from the surface to be cleaned at a first angle. In one example, the first angle is 90 degrees, and more preferably, an angle of 90±10 degrees. This orientation of pivot neck 104 may also be referred to as an unlocked position/configuration.

On the other hand, when the pivot neck 104 is rotated such that the tooth 190 is within the confines of the first region 123, the first locking member 130-1 gets displaced towards the first caster 112-1 and away from the pivot neck 104 based on the spring bias forced supplied by spring 139 and the width of the first region 123 (See FIG. 3C) allowing for travel of the locking tab 164 towards the first caster 112-1 and ultimately into a locking slot provided by the same. Stated differently, the overall width between the first and second annular rings 119-1, 119-2 (e.g., OD2 as discussed above) of the first region 123 allows for the tooth 190 to be displaced by the bias force provided by the spring 139 and travel towards the first caster 112-1. The second locking member 130-2 preferably includes a substantially similar configuration and allows for the second locking member 130-1 to be displaced towards the second caster 112-2 in a synchronized manner with the first locking member 130-1 based on the second pivot neck 129-2. In this example, rotation of the pivot neck 104 can include the user rotating a handle member to cause the pivot neck 104 to extend from the surface to be cleaned at a second angle. In one example, the second angle is 45 degrees, and more preferably, an angle of 45±10 degrees. This orientation of the pivot neck 104 may also be referred to as a locked position/configuration. Note, the aforementioned locked and unlocked positions are not necessarily limited to the specific first and second example angles discussed above, and other angles are within the scope of this disclosure.

Note, although the present disclosure describes and illustrates displacing locking members, e.g., first locking member 130-1, via mechanical actuation provided via the pivot neck 104, this disclosure is not limited in this regard. For example, in some cases a solenoid (not shown) or other component may be implemented within a nozzle to cause locking members to selectively lock and unlock movement of associated casters. To this end, user input may be received via a feature disposed on handle, e.g., a button, switch or other suitable device, that causes a signal to be sent to the solenoid, and thus by extension, to transition casters between locked and unlocked orientations/configurations.

Likewise, embodiments of the present disclosure can further include mechanical and/or electro-mechanical actuation of locking members via components other than those provided by neck 104 with minor modification. For instance, the nozzle can include a pedal, button, switch or other suitable feature disposed on the nozzle to allow a user to selectively lock and unlock casters during cleaning operations, e.g., via a solenoid, mechanical actuator, linkages, and so on.

Continuing on, each of the first and second casters 112-1, 112-2 preferably include a caster body and first and second wheels 140-1, 140-2 respectively coupled/mounted thereto. The body of each of the first and second casters 112-1, 112-2 further preferably defines first and second locking slots 142-1, 142-2, respectively. The body of each of the first and second casters 112-1, 112-2 preferably includes a shaft/axel, e.g., shaft 180-1 (See FIG. 3D), that define first and second caster rotational axis 182-1, 182-2 (See FIG. 3A). Each of the first and second caster rotational axis 182-1, 182-2 preferably extend substantially transverse relative to surface to be cleaned during cleaning operations. Each of the first and second locking slots 142-1, 142-2 is preferably configured to receive at least a portion of locking members 130-1, 130-2, respectively (e.g., locking tab 164) to lock the first and second wheels 140-1, 140-2 and prevent rotation about a corresponding caster rotational axis in the locked configuration.

In operation, the locked configuration preferably results in the first and second casters 112-1, 112-2 being held in a fixed orientation/configuration that includes the first and second wheels 140-1, 140-2 having an associated axis of rotation 184 (See FIG. 3F) that extends substantially parallel with the longitudinal axis of the nozzle housing 102 (and substantially transverse relative to the first and second caster rotational axis 182-1, 182-2). The fixed orientation further preferably restricts the nozzle 100 from traveling along cleaning directions other than backward/forward as shown by directional arrows labeled D1, D2, respectively. For instance, the fixed orientation preferably prevents or otherwise resists a user pushing/pulling the nozzle 100 along directions that extend substantially parallel with the longitudinal axis of the nozzle housing 102. Stated differently, the fixed orientation in the locked configuration preferably limits movement of the nozzle 100 along a single axis during cleaning operations.

Figure 3F:
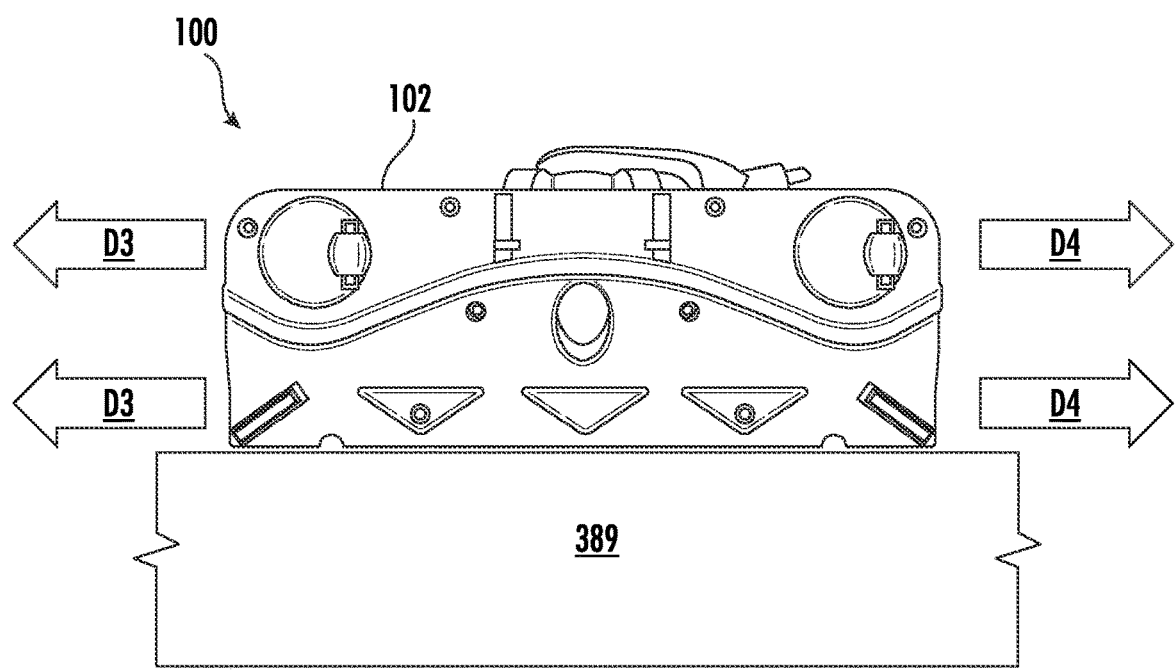
FIG. 3F shows a nozzle implementing a caster locking arrangement consistent with the present disclosure in an unlocked, or multi-directional configuration.

On the other hand, the locking members 130-1, 130-2 may be displaced, as discussed above, such that the same do not extend into the first and second locking slots 141-1, 142-2 of the first and second casters 112-1, 112-2, respectively thereby unlocking rotation of the same. This unlocked orientation/configuration may be referred to as a multi-direction, or a side-cleaning configuration. In this side-cleaning configuration, the user can push/pull the nozzle 100 via a handle coupled to the pivot neck 104 in a lateral direction that extends substantially parallel with the longitudinal axis of the nozzle housing 102. One example of the side-cleaning orientation is shown in FIG. 3F. As shown, a user can push/pull the nozzle 100 along directions D3 and D4 (which may also be referred to as lateral directions), which extend parallel with wall 389. Thus, a user can transition the nozzle 100 to the side-cleaning orientation, e.g., via rotational movement of the pivot neck 104 as discussed above, and then target dust/debris along the surfaces adjacent the wall 389. Accordingly, the unlocked configuration preferably allows for movement of the nozzle 100 along a plurality of (different) axes during cleaning operations. More preferably, the unlocked configuration allows for a user to push/pull the nozzle 100, e.g., via a handle, in any direction (e.g., 360 degrees) about the nozzle 100.

The caster locking arrangement 118 thus allows for rotational movement of the pivot neck 104 to be translated into linear movement and actuation of the caster locking features described above. Accordingly, the caster locking arrangement 118 provides a rack and pinion configuration using an arrangement of components that intuitively allows for selective locking and unlocking of the casters, and thus by extension, allows for a user to lock a surface cleaning device into forward/backward cleaning directions (e.g., cleaning movements along a single axis) or unlock the surface cleaning device to target areas via multi-directional movements (e.g., cleaning movements along a plurality of axes). The multi-directional movements preferably extend in any direction a full 360 degrees about a surface cleaning device having a nozzle consistent with the present disclosure.

FIGS. 4A-4C show a caster lock assembly 400 in accordance with an embodiment. The caster lock assembly 400 can be implemented within a nozzle housing, e.g., the nozzle housing 102 (See FIGS. 1-2) with minor modification.

As shown, the caster lock assembly 400 includes a base 402. The base 402 preferably includes a rectangular shape/profile, although other shapes and configurations within the scope of this disclosure. The base 402 further preferably includes a substantially flat mounting surface 404. A caster lock arrangement 406 preferably mounts to and is supported by the mounting surface 404. The caster lock arrangement 406 further preferably includes first and second locking tracks 408-1, 408-2, which are disposed substantially parallel with each other along the base 402, and more preferably, in parallel with each other and with a longitudinal axis of the base 402. Each of the first and second locking tracks 408-1, 408-2 preferably include an end coupled to a locking actuator 410. Each of the first and second locking track 408-1, 408-2 preferably include caster locking receptacles that securely hold casters/wheels and allow for selectively engaging rotational locking of the same, as discussed below.

The locking actuator 410 preferably includes a housing coupled at an end of the mounting surface 404. The housing of the locking actuator 410 preferably includes a through hole/cavity and a sliding portion 411 extending through the cavity. The sliding portion 411 preferably extends substantially transverse relative to the longitudinal axis of the base 402.

The locking actuator 410 further preferably includes an engagement lever 418 that extends through a selection slot 419 of the base 402 (See FIG. 4B). The selection slot 419 of the base 402 preferably includes at least two selectable positions for the engagement lever 418, whereby the two selectable positions are preferably disposed at opposite ends of the selection slot 419. Thus, the engagement lever 418 can be displaced between the at least two selectable positions to slidably select a locked or unlocked configuration/orientation for the locking actuator 410. A vacuum/surface cleaning device implementing the caster lock assembly 400 may therefore include linkages or other suitable mechanical components (not shown) to displace the engagement lever 418 within the slot 419 to cause the locking actuator 410 to transition to a desired locked or unlocked configuration.

FIG. 4C shows a cross-sectional view of the caster lock assembly 400 in accordance with an embodiment. As shown, the first locking track 408-1 preferably provides a channel in which first and second linkage arms 420-1, 420-2 are disposed. The channel preferably extends substantially parallel with the longitudinal axis of the base 402. The first and second linkage arms 420-1, 420-2 preferably comprise substantially flat sections that slidably engage the surfaces of the first locking track 408-1 that define the channel.

The first linkage arm 420-1 preferably couples to arms 424-1 and the second linkage arm 420-2 preferably couples to arms 424-2. The arms 424-1, 424-2 may be integrally formed with the associated first and second linkage arms as a single, monolithic piece. The first and second linkage arms 420-1, 420-2 preferably extend along the length of the base 402 and synchronize actuation of the arms 424-1 and 424-2, as will be discussed below.

Continuing on with FIG. 4C, and with additional reference to FIG. 4D, the locking actuator 410 further preferably includes a sliding portion 411 that gets actuated based on, for example, engagement lever 418 discussed above. A pin, e.g., pin 428, preferably extends from an end of the sliding portion 411 in a substantially transverse orientation.

As further shown, an end of each of the first and second linkage arms 420-1, 420-2 preferably include angled slots 422-1, 422-2, respectively. FIG. 4D shows the angled slots 422-1, 422-2 more clearly based on first and second linkage arms 420-1, 420-2 being illustrated as transparent. As shown, the angled slots 422-1, 422-2 include a crisscross orientation whereby the same are aligned and angled such that a through hole is formed therebetween and allows the pin 428 of sliding portion 411 to extend therethrough. The first and second angled slots 422-1, 422-2 preferably extend at different angles relative to the sliding portion 411 such that the first and second angled slots 422-1, 422-2 intersect with each other and form the through-hole where the two align/intersect with each other.

According, the angle of each of the first and second angled slots 422-1, 422-2 permits their respective linkage arms to translate linear movement of the sliding portion 411 forward/backward along directions D1/D2 into proportional movement of the first and second linkage arms 420-1, 420-2 along directions D3/D4, with the first and second linkage arms 420-1, 420-2 being configured to travel in opposite directions along the same axis.

Thus, linear movement of sliding portion 411 in a first direction (directions D1/D2) causes the first and second linkage arms 420-1, 420-2, and more importantly arms 424-1 and 424-2, to move in opposite directions of each other (e.g., along directions D3/D4).

As shown in the example of FIG. 4C, the sliding portion 411 is in a locked orientation/configuration whereby pin 428 (See FIG. 4D) is displaced to a position adjacent the housing of the sliding portion 411. In this scenario, the first and second angled slots 422-1, 422-2 are configured to cause corresponding linkage arms to actuate the first and second linkage arms 420-1, 420-2, and in response thereto, arms 424-1, 424-2 supply force in opposite directions, e.g., preferably towards each other, and against the casters 414-1, 414-2. The first and second linkage arms 420-1, 420-2 and corresponding rotational lock assemblies thus collectively form caster locking receptacles in this example.

As further shown, each of the arms 412-1, 412-2 couples to a rotation lock assembly 429. The rotation lock assembly 429 includes an arm coupling section at one end and a caster stop or pad at the other. Each rotation lock assembly 429 may then supply a compressive force against casters 414-1, 414-2 based on actuation of first and second linkage arms 420-1, 420-2 as discussed above.

Each rotation lock assembly 429 preferably includes an axle, e.g., axle 413, that allows each of the casters 414-1, 414-2 to rotate in a restricted/locked manner, whereby the locked rotation allows for rotational movement about the axle 413. This locked rotation allows for an associated nozzle housing (not shown) to be pushed forward/backward generally along a forward/back axis (e.g., to limit movement of the associated nozzle along a single axis) that follows directions D1/D2 during cleaning operations, with the forward/back axis extending substantially transverse to the longitudinal axis of the base 402.

Conversely, linear movement of sliding portion 411 in a second direction that displaces pin 428 to a position adjacent the housing of the locking actuator 410 can result in the first and second linkage arms 420-1, 420-2, and more importantly arms 424-1 and 424-2, moving away from each other (e.g., to transition to the unlocked configuration). This results in each associated rotation lock assembly, e.g., rotation lock assembly 429, being pulled/displaced away from casters 414-1, 414-2. In response, casters 414-1, 412-2 can rotate about a plurality of rotational axis to accomplish, for example, side-ways cleaning (e.g., movement of an associated nozzle in a plurality of different axes during cleaning) as discussed above. Note, the second locking track 408-2 preferably includes a mirror-image configuration of the first locking track 408-1, the description of which will not be repeated for brevity. However, as is shown, the second locking track 408-2 preferably includes linkage arms with corresponding angled slots (not shown) to couple to the sliding portion 411 and ensure that the casters 414-3, 414-04 (and corresponding casters 412-3, 412-4), lock and unlock in a synchronized fashion with the casters 414-1, 414-2.

FIG. 5 shows an example of a rotation lock assembly for use with casters wheels of a surface cleaning device in accordance with an embodiment.

FIG. 6 shows another actuation assembly suitable for use with the rotation lock assembly of FIG. 5. As shown, actuating arm 602 is preferably coupled to rotating portion 604. The rotating portion 604 preferably couples to linkage arms 606-1, 606-2, and rotation of the rotating portion 604 can then be translated into linear movement of pistons/shafts 608-1, 608-2 to lock/unlock an associated caster wheel.

FIGS. 7A-7C show an example vacuum device 700 with a caster locking arrangement consistent with the present disclosure. As shown, the vacuum device includes mechanical actuators 702, 704, that when compressed, e.g., based on contact with a wall surface, cause casters 706, 708 to transition to an unlocked orientation as generally shown in FIG. 7B. The mechanical actuators 702, 704 can be implemented as spring-loaded sensors such as shown. However, other types of pressure sensors and/or proximity sensors may be utilized with minor modification. In any such cases, the mechanical actuators 702, 704 may be coupled to, for instance, any caster locking arrangement as variously disclosed herein to cause the same to lock/unlock casters 706, 708. The unlocked orientation then allows the casters 706, 708 to rotate about a plurality of rotational axis to permit the vacuum/surface cleaning device to perform side-walls cleaning as discussed above. Conversely, in the absence of a wall or other similar vertical surface, the mechanical actuators 702, 704 transition the casters to an "locked" position as shown in FIG. 7C, which limits or otherwise resists travel of the vacuum/surface cleaning device in directions other than simply forwards/backwards.

FIGS. 8 and 9 show articulating neck features of the surface cleaning device of FIGS. 7A-7C when using the same during side-ways/multi-directional cleaning.

One aspect of the present disclosure includes a caster locking assembly. The caster locking assembly comprising a base defining a mounting surface, at least a first caster locking receptacle coupled to the mounting surface, the first caster locking receptacle having a wheel and a rotation lock assembly to selectively engage the wheel and limit directional movement thereof, a first locking rail coupled to the mounting surface and having first and second linkage arms, the first linkage arm defining a locking arm coupled to a first side of the rotation lock assembly, and the second linkage arm defining a locking arm coupled to a second side of the rotation lock assembly, and a locking actuator coupled to the first and second linkage arm and configured to slidably displace the first and second linkage arms to cause the rotation lock assembly to engage the wheel and limit directional movement thereof.

In the cast locking assembly, each of the first and second linkage arms can include angled slots, the angled slots to align and receive a pin of the locking actuator, wherein the angled slots are configured to cause the first and second linkage arms to be displaced in opposite directions based on linear movement of the pin of the locking actuator.

The caster locking assembly can further comprise a second caster locking receptacle coupled to the mounting surface, the second caster locking receptacle having a wheel and a rotation lock assembly to selectively engage the wheel and limit directional movement thereof. In the caster locking assembly, the first linkage arm can further provide a locking arm coupled to a first side of the second caster locking receptacle, and the second linkage arm can provide a locking arm coupled to a second side of the second caster locking receptacle.

The caster locking assembly can further include a second locking rail coupled to the mounting surface of the base. In the caster locking assembly, the second locking rail can include at least first and second caster locking receptacles.

In the caster locking assembly, the locking actuator can be coupled to the second locking rail and can be configured to synchronize locking and unlocking of the first and second caster locking receptacles of the first locking rail with the first and second caster locking receptacles of the second locking rail.

In accordance with another aspect of the present disclosure a nozzle for use with a surface cleaning device is disclosed. The nozzle including a nozzle housing defining a dirty air inlet, at least a first caster coupled to the nozzle housing to allow for movement of the nozzle housing over a surface to be cleaned, and a caster locking arrangement coupled to the nozzle housing, the caster locking arrangement having at least a first locking member to transition the first caster between a locked configuration and an unlocked configuration, the locked configuration limiting movement of the nozzle housing along a single axis during cleaning operations, and the unlocked configuration allowing for movement of the nozzle housing along a plurality of axes during cleaning operations.

In accordance with another aspect of the present disclosure a surface cleaning device with a suction motor is disclosed. The surface cleaning device including a nozzle housing with a dirty air inlet fluidly coupled to the suction motor, at least a first caster coupled to the nozzle housing to allow for movement of the nozzle housing over a surface to be cleaned, and a caster locking arrangement coupled to the nozzle housing, the caster locking arrangement having at least a first locking member to transition the first caster between a locked configuration and an unlocked configuration, the locked configuration limiting movement of the surface cleaning device along a single axis during cleaning operations by a user, and the unlocked configuration allowing for movement of the nozzle housing along a plurality of axes during cleaning operations by the user.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a surface cleaning apparatus/device may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A nozzle for use with a surface cleaning device, the nozzle comprising:
   a nozzle housing;
   a caster assembly coupled to the nozzle housing to allow for movement of the nozzle housing over a surface to be cleaned, the caster assembly including:
      a caster cavity;
      a caster ball disposed within the caster cavity and configured to freely rotate within the caster cavity; and
      a caster lock assembly configured to selectively restrict rotation of the caster ball to a single rotation axis, the caster lock assembly including:
         at least one axle extending along the single rotation axis; and
         a caster stop coupled to each axle and configured to selectively apply a compressive force on the caster ball, wherein rotation of the caster ball is restricted to the single rotation axis when the caster stop applies the compressive force to the caster ball;
   a locking actuator configured to actuate the caster lock assembly;
   a locking track;
   a first linkage; and
   a second linkage, the first and second linkages being slidably disposed within the locking track, wherein the linkages are configured to be moved within the locking track by the locking actuator.

2. The nozzle of claim 1, wherein the locking actuator includes a pin configured to be received within a first slot defined in the first linkage and a second slot defined in the second linkage.

3. The nozzle of claim 2, wherein the first slot extends transverse to the second slot such that the first and second slots define an intersection point, the pin extending through the intersection point.

4. The nozzle of claim 1, wherein the first linkage includes a first arm extending therefrom and the second linkage includes a second arm extending therefrom.

5. The nozzle of claim 4, wherein the at least one axle includes a first axle extending from the first arm and a second axle extending from the second arm.

6. A nozzle for use with a surface cleaning device, the nozzle comprising:
   a nozzle housing;
   a neck pivotally coupled to the nozzle housing;
   a hose extending through the neck;
   a caster assembly coupled to the nozzle housing to allow for movement of the nozzle housing over a surface to be cleaned, the caster assembly including:
      a caster cavity;
      a caster ball disposed within the caster cavity and configured to freely rotate within the caster cavity; and
      a caster lock assembly configured to selectively restrict rotation of the caster ball to a single rotation axis, the caster lock assembly including:
         at least one axle extending along the single rotation axis; and
         a caster stop coupled to each axle and configured to selectively apply a compressive force on the caster ball, wherein rotation of the caster ball is restricted to the single rotation axis when the caster stop applies the compressive force to the caster ball;
   a locking actuator configured to actuate the caster lock assembly;
   a locking track;
   a first linkage; and
   a second linkage, the first and second linkages being slidably disposed within the locking track, wherein the linkages are configured to be moved within the locking track by the locking actuator.

7. The nozzle of claim 6, wherein the locking actuator includes a pin configured to be received within a first slot defined in the first linkage and a second slot defined in the second linkage.

8. The nozzle of claim 7, wherein the first slot extends transverse to the second slot such that the first and second slots define an intersection point, the pin extending through the intersection point.

9. The nozzle of claim 6, wherein the first linkage includes a first arm extending therefrom and the second linkage includes a second arm extending therefrom.

10. The nozzle of claim 9, wherein the at least one axle includes a first axle extending from the first arm and a second axle extending from the second arm.

11. A nozzle for use with a surface cleaning device, the nozzle comprising:
- a nozzle housing;
- a neck pivotally coupled to the nozzle housing;
- a caster assembly coupled to the nozzle housing to allow for movement of the nozzle housing over a surface to be cleaned, the caster assembly including:
  - a caster cavity;
  - a caster ball disposed within the caster cavity and configured to freely rotate within the caster cavity; and
  - a caster lock assembly configured to selectively restrict rotation of the caster ball to a single rotation axis, the caster lock assembly including:
    - at least one axle extending along the single rotation axis; and
    - a caster stop coupled to each axle and configured to selectively apply a compressive force on the caster ball, wherein rotation of the caster ball is restricted to the single rotation axis when the caster stop applies the compressive force to the caster ball;
  - a locking actuator configured to actuate the caster lock assembly;
  - a locking track;
  - a first linkage; and
  - a second linkage, the first and second linkages being slidably disposed within the locking track, wherein the linkages are configured to be moved within the locking track by the locking actuator.

12. The nozzle of claim 11, wherein the locking actuator includes a pin configured to be received within a first slot defined in the first linkage and a second slot defined in the second linkage.

13. The nozzle of claim 12, wherein the first slot extends transverse to the second slot such that the first and second slots define an intersection point, the pin extending through the intersection point.

14. The nozzle of claim 11, wherein the first linkage includes a first arm extending therefrom and the second linkage includes a second arm extending therefrom and the at least one axle includes a first axle extending from the first arm and a second axle extending from the second arm.

* * * * *